(12) United States Patent
Saunders et al.

(10) Patent No.: US 9,541,226 B2
(45) Date of Patent: Jan. 10, 2017

(54) ANTI-ROTATION WORM GEAR CLAMP

(75) Inventors: Robert H. Saunders, Oak Park, MI (US); Robert J. Mohan, Canton, MI (US); Jeffrey P. Luther, Ann Arbor, MI (US); Scott M. Rollins, Canton, MI (US); Erik H. Hermann, Ann Arbor, MI (US); Darice M. Morris, Wolverine Lake, MI (US); Roger Khami, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 816 days.

(21) Appl. No.: 13/346,793

(22) Filed: Jan. 10, 2012

(65) Prior Publication Data

US 2013/0174385 A1 Jul. 11, 2013

(51) Int. Cl.
*F16L 33/08* (2006.01)

(52) U.S. Cl.
CPC ............. *F16L 33/08* (2013.01); *Y10T 24/1441* (2015.01)

(58) Field of Classification Search
CPC .............................. F16L 33/08; Y10T 24/1441
USPC ............ 24/274 R, 274 P, 274 WB, 279, 280, 24/281, 24/282, 284
See application file for complete search history.

(56) References Cited

U.S. PATENT DOCUMENTS

| | | |
|---|---|---|
| 3,028,650 A | 4/1962 | Tinsley |
| 3,454,996 A * | 7/1969 | Tetzlaff et al. ................. 24/283 |
| 3,950,830 A | 4/1976 | Duprez |
| 6,205,624 B1 | 3/2001 | Mockridge |
| 6,942,253 B2 | 9/2005 | Bowater |
| 7,328,488 B1 | 2/2008 | Gallo |
| 7,761,962 B2 | 7/2010 | Krauss et al. |
| 8,060,991 B2 * | 11/2011 | Ryhman et al. ............ 24/274 R |
| 2003/0188402 A1 | 10/2003 | Kleller et al. |

* cited by examiner

*Primary Examiner* — Jack W Lavinder
(74) *Attorney, Agent, or Firm* — James Dottavio; MacMillan, Sobanski & Todd, LLC

(57) ABSTRACT

An assembly for clamping a tube includes a fitting including a land, a bolt housing, legs, and a tooth on each leg, a band surrounding an axis, contacting the land and formed with holes spaced along the band, and a bolt located in the bolt housing, including helical teeth engaged with said holes for changing a diameter of the band and forcing the tooth toward the band as the band is tightened by rotating the bolt.

13 Claims, 2 Drawing Sheets

ANTI-ROTATION WORM GEAR CLAMP

BACKGROUND OF THE INVENTION

1. Field of the Invention

This invention relates generally to tightening a band clamp around a hose end, more particularly to preventing rotation of the band clamp as a clamp bolt is rotated and the clamp band is tightened.

2. Description of the Prior Art

Cylindrical tubes are connected to a spigot on a component in a fluid system by a band clamp, which is tightened around the tube and the component to form a leak-proof connection. A clamp bolt engaged with the clamp band to form a worm gear clamp is rotated about an axis of the bolt to tighten the clamp.

It is possible that the worm gear clamp rotates around the hose, away from the operator, in the direction that the bolt is being rotated during the assembly process, thereby causing the insufficient torque to be applied to the clamp bolt.

This inadvertent rotation of the clamp band can also produce incorrect alignment to the spigot.

SUMMARY OF THE INVENTION

An assembly for clamping a tube includes a fitting including a land, a housing, first and second legs spaced along the land, a recess and a tooth in each of the legs; a band surrounding an axis, contacting the land and formed with holes spaced along the band; and a bolt located in the housing, including teeth engaged with said holes for changing a diameter of the band as the band is tightened by rotating the bolt. Both of the legs and the tooth located on each leg are formed integrally with the fitting.

Incorporating the teeth into the worm gear clamp fitting provides leverage at the primary loading point of the securing process. The worm gear clamp is prevented from rotating around the hose, away from the operator, in the direction that the bolt is being rotated during the assembly process, thereby permitting sufficient torque to be applied to the clamp bolt and ensuring a leak-proof connection.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
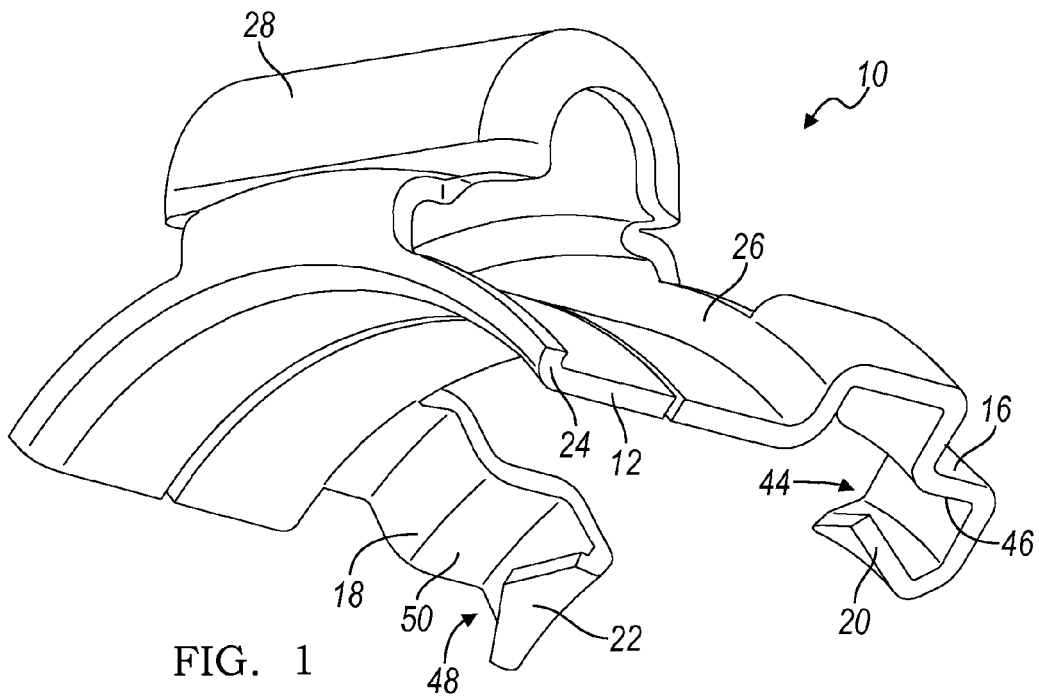
FIG. 1 is an isometric side view of a fitting for an anti-rotation worm gear clamp.
Figure 2:
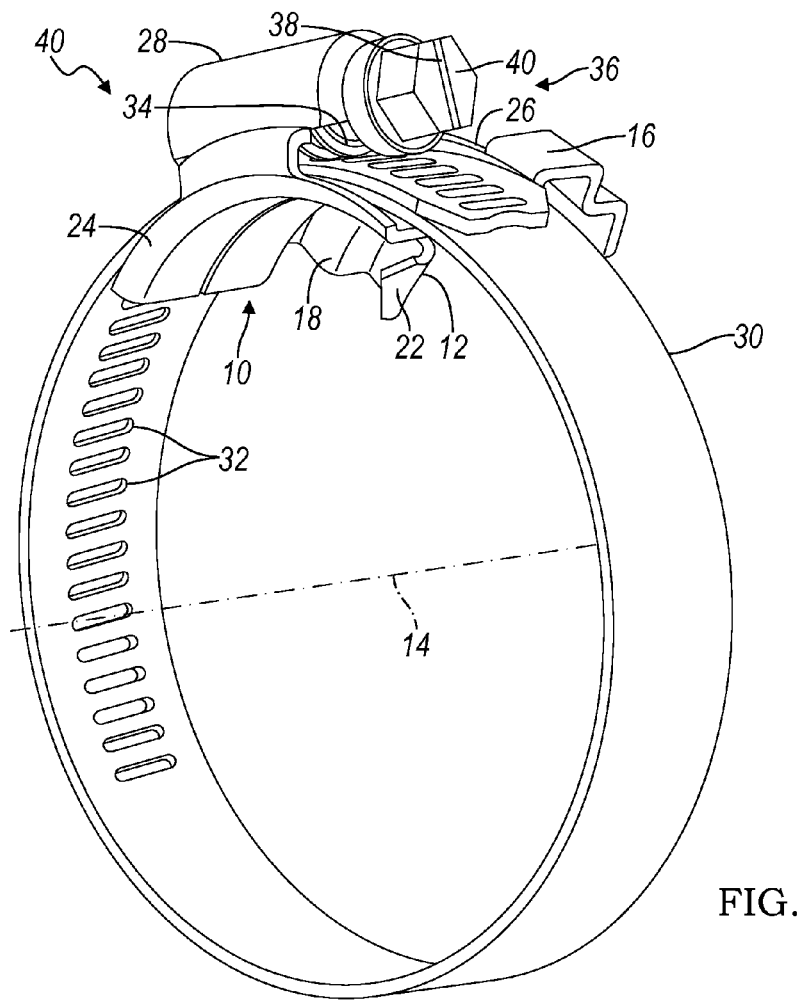
FIG. 2 is an isometric side view showing a clamp and clamp bolt installed in the fitting of FIG. 1.
Figure 4:
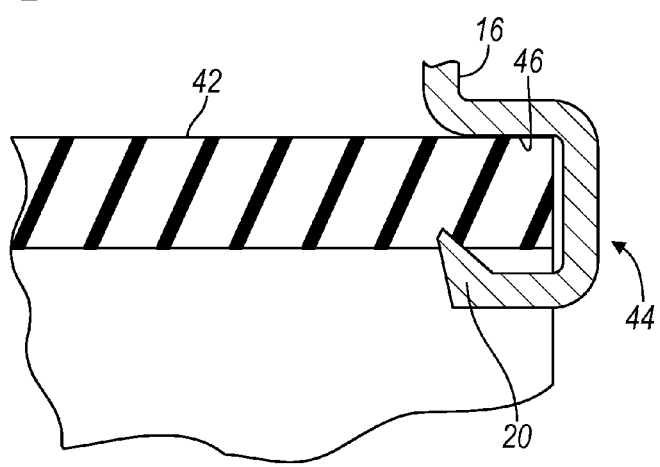
FIG. 4 is a cross section side view showing a tooth engaged with the tube wall.

Referring first to FIGS. 1 and 2, a worm gear clamp fitting 10 includes an annular land 12, which extends angularly about a central axis 14 and axially along the axis; two legs 16, 18 spaced angularly about axis 14 and secured to and extending from land 12; a tooth 20 at the end of leg 16; a tooth 22 at the end of leg 18; a lip 24 extending along land 12; a second lip 26 extending along land 12 at the opposite side of the land from lip 24; and a cylindrical clamp bolt housing 28 extending along the land and bridging across the land from lip 24 to lip 26. Both of legs 16, 18 are formed integrally with fitting 10.

FIG. 2 shows a clamp band 30, preferably of metal, formed with elongated holes 32 spaced along a length of the clamp band and located on land 12 between lips 24, 26. Helical threads 34 formed on a clamp bolt 36 engage the holes 32 when the clamp bolt is installed in the clamp bolt housing 28. A slot 38 formed in the head 40 of clamp bolt 36 and engaged with a rotating driving tool, rotates the bolt 36 about its axis causing the clamp band 30 to expand and contact its diameter. Fitting 10 and clamp band 30 form an anti-rotation worm gear clamp assembly 40.

Figure 3:
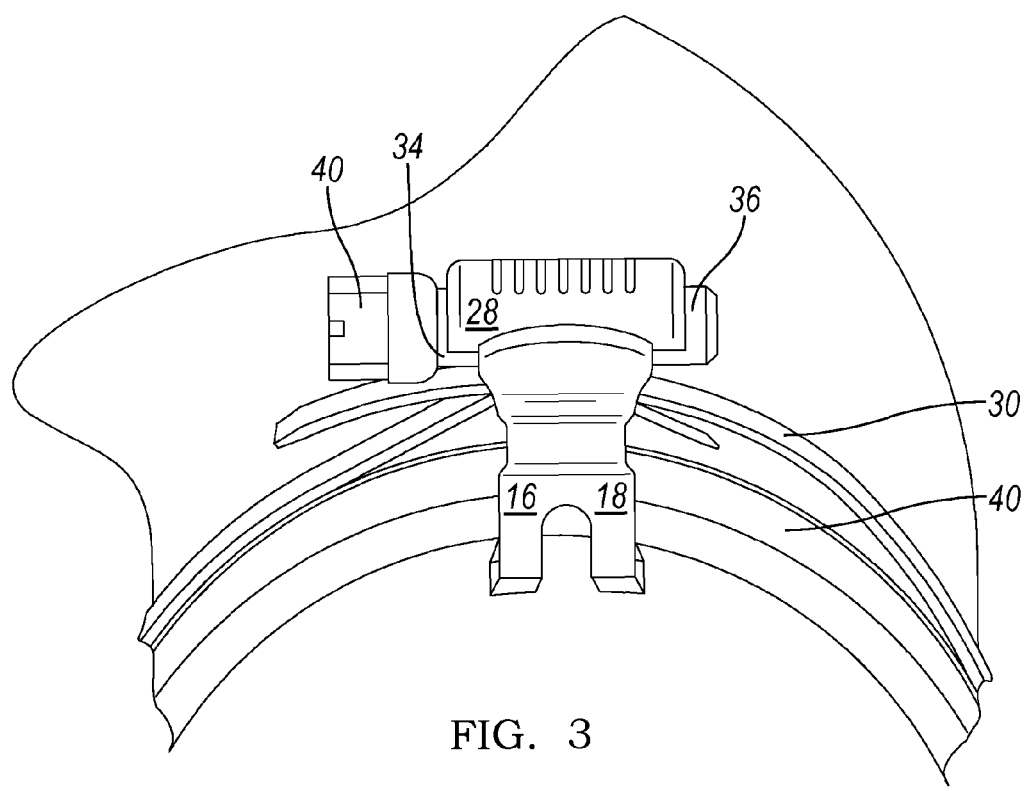
FIG. 3 is an end view showing the anti-rotation worm gear clamp assembly of FIG. 2 fitted over and engaged with a hose.

FIG. 3 shows the anti-rotation worm gear clamp assembly 40 fitted over and engaged with a hollow cylindrical hose 42. Preferably the hose is an extruded rubber or silicone hose. The wall thickness of tube 42 is fitted into a recess 44 formed in leg 16 between the tip of tooth 20 and the inner surface 46, and into a recess 48 formed in leg 18 between the tip of tooth 22 and the inner surface 50 of leg 28. The wall thickness preferably is greater than the depth distance between the tip of teeth 22 and surfaces 44, 46 such that the teeth pierce the inner surface of the hose 42 and thereby mechanically engage the hose through a portion of the wall thickness of the hose.

The legs 16, 18 of fitting 10 are in the form of U-channels that overlap the end of tube 42 and direct the teeth 20, 22 toward the inner surface of the tube. When the clamp bolt 36 is rotated clockwise, clamp band 30 is tightened around the outer surface of the hose 42 with teeth 20, 22 engaged with the wall of tube 42.

Preferably teeth 20, 22 are approximately 10 mm long by 3 mm wide and are angled inward toward the inner surface of tube 42, the last 3 mm of the length coming to a sharpen point that can pierce 3 mm into the wall thickness the hose.

Preferably fitting 10 includes one tooth 20, 22 located at each side of the clamp bolt housing 28, thereby providing an attachment between fitting 10 and hose 42 that prevents the band clamp 30 from rotating around the hose while clamp bolt 36 is rotated and the clamp band is being tightened.

Preferably teeth 20, 22 and clamp bolt housing 28 are formed integrally, i.e., are formed of a single piece. But the teeth 20, 22 can be welded to the clamp bolt housing 28 in a secondary operation, which is less preferred than the integral construction.

In accordance with the provisions of the patent statutes, the preferred embodiment has been described. However, it should be noted that the alternate embodiments can be practiced otherwise than as specifically illustrated and described.

The invention claimed is:

1. A tube clamping assembly, comprising:
   a fitting including a land extending circumferentially about a central axis and axially along the axis, the land having two portions separated by a circumferentially extending gap, a bolt housing integrally connected to both of the portions of the land, a leg integral with and extending from one of the two portions, and a tooth on the leg, both portions of the land, the bolt housing, the leg and the tooth being formed as a single monolithic piece;

a band surrounding the axis, contacting both portions of the land radially outward from the axis, the band formed with holes spaced along the band;
a bolt located in the bolt housing, including teeth engaged with said holes for changing a diameter of the band as the band is tightened by rotating the bolt.

2. The tube clamping assembly of claim 1, further comprising:
a second leg extending from one of the two portions of the land; and
a second tooth located on the second leg and able to be forced toward an axis as the band is tightened by rotating the bolt, the second leg and the second tooth being formed as a single monolithic piece with the land.

3. The tube clamping assembly of claim 1, further comprising:
a first lip extending circumferentially along one of the portions of the land and located at a first side of the land;
a second lip extending circumferentially along the other of the portions of the land and located at a second side of the land opposite the first side.

4. The tube clamping assembly of claim 1, wherein the band is elastically flexible, the holes are elongated, a length of each hole being directed across a width of the band, the holes being spaced mutually along a length of the band.

5. A tube clamping assembly, comprising:
a fitting including a land extending circumferentially about a central axis and axially along the axis, the land having two portions separated by a circumferentially extending gap, a bolt housing integrally connected to both of the portions of the land, first and second legs integral with and extending from one of the two portions and spaced apart circumferentially along the land, a recess and a tooth in each of the legs, both portions of the land, the bolt housing, the first and second legs, the recesses, and the teeth being formed as a single monolithic piece;
a band surrounding the axis, contacting both portions of the land radially outward from the axis, the band formed with holes spaced along the band;
a bolt located in the bolt housing, including teeth engaged with said holes for changing a diameter of the band as the band is tightened by rotating the bolt.

6. The tube clamping assembly of claim 5, further comprising:
a first lip extending circumferentially along one of the portions of the land and located at a first side of the land;
a second lip extending circumferentially along the other of the portions of the land and located at a second side of the land opposite the first side.

7. The tube clamping assembly of claim 5, wherein the band is elastically flexible, the holes are elongated, a length of each hole being directed across a width of the band, the holes being spaced mutually along a length of the band.

8. A clamped connection, comprising:
a fitting including a land extending circumferentially about a central axis and axially along the axis, the land having two portions separated by a circumferentially extending gap, a bolt housing integrally connected to both of the portions of the land, a leg integral with and extending from one of the two portions, the leg including a recess and a tooth, both portions of the land, the bolt housing, the leg, the recess and the tooth being formed as a single monolithic piece;
a tube including an end surface located in the recess, and a wall that is engaged by the tooth;
a band extending circumferentially around the tube and formed with holes spaced along the band;
a bolt located in the bolt housing including threads for engaging the holes, the band being clamped against the tube as the band is tightened by rotating the bolt.

9. The clamped connection of claim 8, wherein the leg extends from an outer surface of the tube, across the end surface, and along an inner surface of the wall.

10. The clamped connection of claim 8, wherein:
the leg extends around an outer surface of the tube, across the end surface, and along an inner surface of the wall; and
the tooth engages the tube by piercing the inner surface of the wall.

11. A clamped connection, comprising:
a fitting including a land extending circumferentially about a central axis and axially along the axis, the land having two portions separated by a circumferentially extending gap, a bolt housing integrally connected to both of the portions of the land, first and second legs integral with and extending from one of the two portions and spaced apart circumferentially along the land, each leg including a recess and a tooth, both portions of the land, the bolt housing, the first and second legs, the recesses, and the teeth being formed as a single monolithic piece;
a tube including an end surface located in the recess, and a wall able to be engaged by at least one of the teeth;
a band extending circumferentially around the tube and formed with holes spaced along the band;
a bolt located in the bolt housing including threads for engaging the holes, the band being clamped against the tube as the band is tightened by rotating the bolt.

12. The clamped connection of claim 11, wherein the legs extend around an outer surface of the tube, across the end surface, and along an inner surface of the wall.

13. The clamped connection of claim 11, wherein:
the legs extend around an outer surface of the tube, across the end surface, and along an inner surface of the wall; and
each tooth is able to engage the tube by piercing the inner surface of the wall.

* * * * *